May 8, 1962 A. G. FISCHER 3,033,659
PREPARATION OF PHOSPHOR CRYSTALS
Filed April 21, 1959
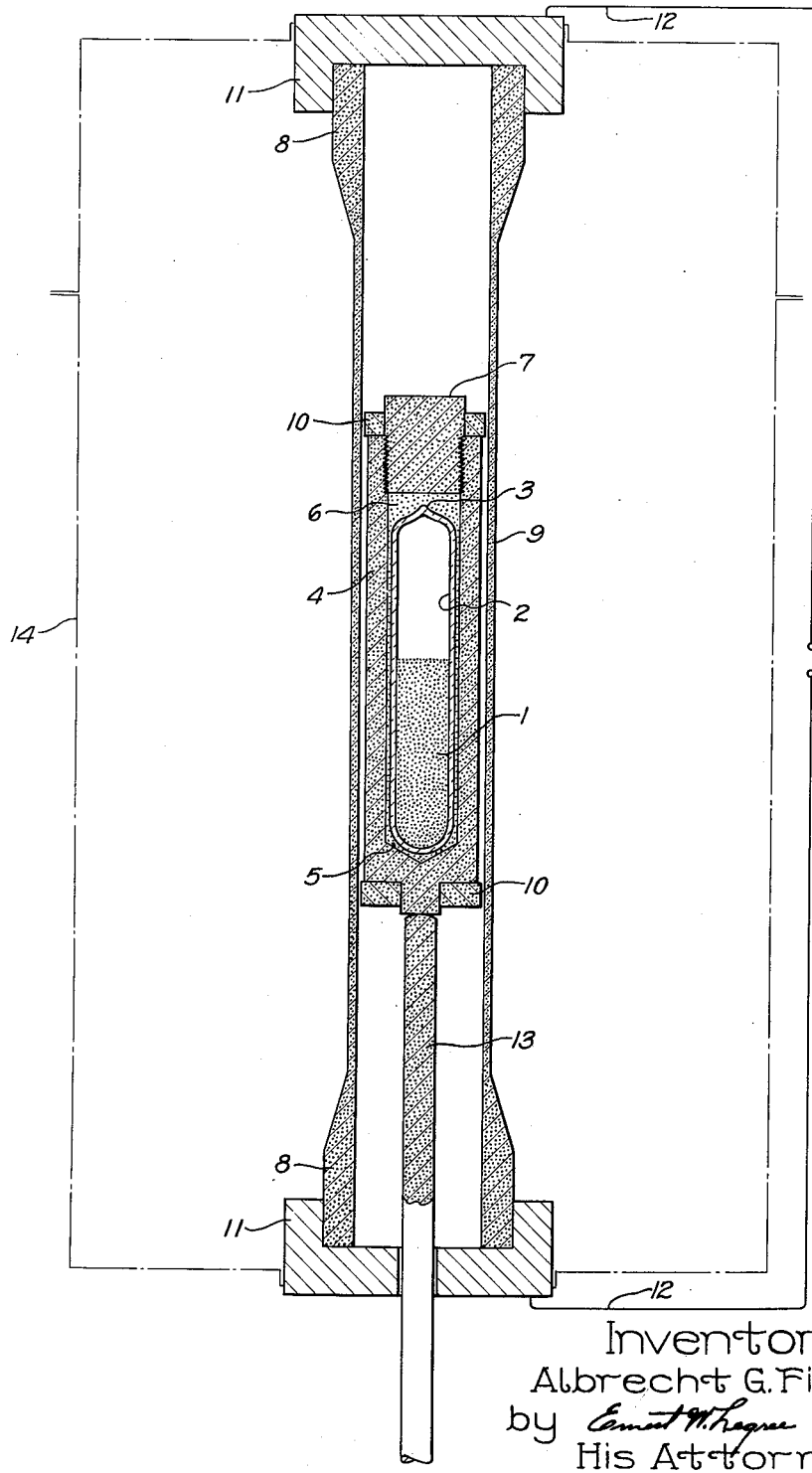
Inventor:
Albrecht G. Fischer
by Ernest W. Legree
His Attorney.

United States Patent Office 3,033,659
Patented May 8, 1962

3,033,659
PREPARATION OF PHOSPHOR CRYSTALS
Albrecht G. Fischer, East Cleveland, Ohio, assignor to General Electric Company, a corporation of New York
Filed Apr. 21, 1959, Ser. No. 807,802
5 Claims. (Cl. 23—295)

This invention relates to the preparation of materials having high melting points concurrently with relatively high vapor pressure, and is particularly useful in the preparation of single crystals of semiconducting phosphors from the melt. It is more specifically concerned with a method and apparatus useful for this purpose.

It has recently been established that sizable single crystals of semiconducting phosphors such as zinc sulfide, cadmium sulfide, zinc selenide and mixtures thereof can be grown by slowly cooling a melt of the phosphors. Because these materials decompose at their melting point temperatures, it has been necessary to melt the materials under high pressure of some inert or neutral gas such as argon in order to confine or cushion back the vapors and thus prevent excessive losses of the more volatile components from the melt. Up until now, this has been done using more or less open or at least porous crucibles of graphite in conjunction with bulky and expensive high temperature, high pressure equipment in the nature of pressure vessels or autoclaves within which a high pressure neutral gas atmosphere was developed in order to cause the vapors from the melt to be confined within the graphite crucible. Moreover, the growing of the crystals in such crucibles in a non-isothermal high pressure furnace does not permit controlling the vacancy equilibrium of the crystals by deliberately varying the confining atmosphere.

In the temperature range of the melting points of the phosphor materials presently of interest, at approximately 1400° C. and up, quartz has already begun to soften and is substantially without mechanical strength. For this reason, sealed-off quartz vessels cannot be used in which to melt the phosphor materials because the vessels would burst before the necessary pressure could be attained. However the use of quartz vessels would be very desirable because quartz does not react chemically with the phosphor materials, can be easily shaped at will, and is relatively inexpensive by comparison with other suitable materials. Furthermore, if hermetically sealed-off and evacuated quartz vessels could be used, the phosphor materials could be melted without any losses due to vaporization or escape of decomposition products. It would also permit melting the phosphor materials under controlled environmental conditions, for instance under increased sulphur pressure as is highly desirable in order to incorporate acceptor impurities into the phosphor lattice without simultaneous vacancy compensation. Finally, if the quartz vessels could be made to withstand the internal pressure without bursting, it would no longer be necessary to use expensive high temperature furnaces or autoclaves and the costly argon atmospheres entailed thereby.

The general object of the invention is to provide a new and improved method for preparing materials having high melting points concurrently with relatively high vapor pressure and which is suitable for the preparation of single crystals of semiconducting phosphor materials from the melt.

A more specific object is to provide a method of growing crystals of semiconducting phosphor materials from the melt and allowing the use of vessels of glassy material such as quartz wherein to confine the phosphor materials and subject them to a controlled atmosphere.

Another object of the invention is to provide equipment particularly suited to carrying out the method in accordance with the invention.

The method in accordance with the invention greatly eases the technical requirements for growing crystals of phosphor materials by permitting the use of sealed-off evacuated quartz vessels or tubes. The quartz vessel is surrounded by a close-fitting outer container or crucible of a highly refractory material such as graphite. Suitable means are provided to heat the quartz vessel initially at a sufficiently rapid rate that the vessel is raised in temperature above its softening point before the phosphor material has become heated sufficiently to develop a substantial vapor pressure. Thereafter further heating may take place, more slowly if desired, up to the desired crystal forming temperature for the particular phosphor materials being processed. This method avoids developing a substantial vapor pressure which would fracture the quartz while it is still at a relatively low temperature and therefore relatively brittle. By the time substantial vapor pressure is developed, the quartz of the vessel has become relatively soft so that it is expanded towards the graphite container which sets a halt to further expansion despite the relatively high vapor pressure within it. After cooling, the quartz vessel is released from the graphite container and the phosphor crystals recovered.

For further objects and advantages and for a fuller understanding of the features of the invention, attention is now directed to the following description and accompanying drawing. The features believed to be novel will be more particularly pointed out in the appended claims.

The single FIGURE of the drawing is a longitudinal sectional view through a quartz vessel and graphite crucible assembly shown in conjunction with an electric furnace suitable for practicing the method of the invention.

Referring to the drawing, in practicing the process of the invention the semiconducting phosphor material in polycrystalline or powder form is placed as indicated at 1 within a quartz tube 2. This of course is done while the upper end 3 of the tube is still open and prior to assembly of the tube into the apparatus illustrated. Air and moisture are thoroughly pumped out, the tube being at this time heated if desired to a few hundred degrees centigrade in order to assist evacuation, and the upper end of the tube is sealed-off as indicated at 3. The quartz tube is then placed in a close fitting thick-walled graphite container or crucible 4 in the form of a hollow cylinder and the empty space between the quartz tube and the graphite crucible is filled with graphite powder. The graphite powder is pressed or tamped in as tightly as possible and of course appears principally at the lower end 5 and at the upper end 6 where the cavity in the graphite crucible cannot conform as closely to the contour of the quartz tube. The graphite crucible is closed at its upper end by a graphite screw 7 which acts as a stopper.

The assembly of the quartz tube and graphite crucible is placed in a suitable furnace which, as illustrated, consists of a hollow carbon tube having relatively thick-walled shouldered ends 8 which taper into a thin-walled central portion 9. The quartz tube and graphite crucible assembly is centrally located within the thin-walled portion of the carbon tube heater and is insulated therefrom by boron nitride rings 10 to prevent shunting of electric current through the graphite crucible. Current is conducted to the carbon tube heater by means of thick-walled copper cups 11 fitting tightly around the ends of the shouldered portions and suitable conductors schematically indicated at 12. The crucible assembly is centrally supported within the carbon tube heater by a refractory rod 13 which may suitably be made of boron nitride. The carbon tube heater is located within a sealed and preferably water-cooled container diagrammatically indicated at 14, which is filled with a neutral gas such as nitrogen to prevent oxidation of the carbon tube heater and graphite crucible. The nitrogen gas filling may be pressurized if desired to relieve the pressure forces on the graphite crucible when melting materials exerting a relatively high vapor pressure such as ZnS.

Other types of furnaces which can attain the required temperatures may of course be used, for instance a wire wound core or a silicon carbide resistive element. The temperatures required to be reached are 1475° C. for CdS, 1515° C. for ZnSe and 1850° C. for ZnS, and temperatures between these values for mixed crystals of the three materials.

In accordance with the invention, the furnace is heated at least initially very rapidly so that the quartz tube reaches a state of plasticity before any substantial build-up of vapor pressure from decomposition of the phosphor material within it. In other words, the quartz tube is heated up so rapidly that it begins to soften while the phosphor material within it is yet comparatively cool. If the quartz tube were heated up slowly and isothermally, the internal vapor pressure would become so high while the quartz is still brittle or non-plastic as to result in breakage of the quartz tube. This applies particularly in the case of ZnS which has a relatively high vapor pressure. With the type of furnace used, the desired rapid heating can readily be achieved by passing initially a very high current through the carbon tube heater. As soon as the quartz tube has softened and become plastic, the internal vapor pressure causes it to expand into perfect conformance with the graphite crucible and graphite powder. This sets a halt to further expansion despite the build-up of vapor pressure within the quartz tube which acts as a plastic impermeable liner within the relatively porous graphite crucible.

After the softening point of the quartz tube has been reached, further heating can take place at a more leisurely pace if desired in order to achieve more accurate control. The terminal temperature may entail a vapor pressure of approximately two atmospheres in the case of CdS and ZnSe, and of 7 to 8 atmospheres in the case of ZnS. In the latter case especially, the walls of the graphite crucible 4 are made relatively thick and good dense electo-graphite is used in order to withstand the forces and the outer container or jacket 14 is pressurized.

The melt is now slowly solidified by gradually lowering the furnace temperature, or if preferred, by moving the crucible slowly down towards the lower end of the carbon tube heater by lowering the supporting rod 13. The lower temperature at the lower end of the carbon tube heater provides a low or gentle temperature gradient within the melt in quartz tube 2 which promotes crystal growth. The phosphor ingot or crystal can be released from the quartz tube 2 and graphite container 4 by breaking them open. If desired, instead of the simple graphite crucible illustrated which must be destroyed each time a crystal is removed, a split graphite crucible allowing disassembly and reassembly can be used.

The tube 2 or vessel within which the phosphor material is contained need not necessarily be made of quartz but it should be made of a glassy or vitreous material. By a glassy material is meant a material which does not have a sharply defined fusion point and which softens and passes through a plastic state in going from solid to fluid. Obviously a substance which changes sharply from solid to liquid at one temperature is not suitable since it cannot act as a plastic expansible container. Among the more promising materials which may be used besides quartz are the quartz-like glasses known under the tradename Vycor and the high temperature boro-silicate glasses. Such materials would of course only be used where a lower temperature is sufficient for the particular semiconducting material being processed.

While the invention has been described in connection with the preparation of semiconducting phosphor materials, it is of course apparent that it can also be used in the preparation of other materials where similar conditions of high temperature and relatively high vapor pressure are encountered, as for instance in the preparation of semiconductors, electroluminophors, photoconductors, piezoelectric frequency standards and optical materials of high refractive index having strong dispersive powers.

The process embodying the invention which has been specifically described and the equipment described and illustrated for carrying out the process are intended as exemplary and not as limitative of the invention whose scope is to be determined by the appended claims.

What I claim as new and desire to secure by Letters Patent of the United States is:

1. A method of growing crystals from materials having relatively high vapor pressures at elevated temperatures and having melting points in a temperature region where the glassy vessels required to enclose them have low mechanical strength, comprising enclosing the crystal forming materials in a glassy vessel, sealing said vessel, enclosing said vessel in a crucible of a substance having a relatively high mechanical strength at elevated temperatures, initially heating said vessel and crucible at a sufficiently rapid rate that the glassy vessel is raised above its softening point before said crystal forming materials develop substantial vapor pressure, heating said vessel to the required temperature for said materials, and thereafter cooling it.

2. A method of growing crystals from materials having relatively high vapor pressures at elevated temperatures and having melting points at temperatures not lower than approximately 1400° C. comprising enclosing the crystal forming materials in a quartz vessel, sealing said vessel, enclosing said vessel in a crucible of a refractory material having a relatively high mechanical strength at elevated temperatures, initially heating said quartz vessel and said crucible at a sufficiently rapid rate that the vessel is raised above its softening point before said crystal forming materials develop substantial vapor pressure, further heating said vessel to the crystal forming temperature of said materials, and thereafter cooling it.

3. A method of growing sizable crystals of semiconducting phosphor materials having relatively high vapor pressures at elevated temperatures and having melting points at temperatures not less than approximately 1400° C. where the quartz vessels used to enclose them have low mechanical strength, comprising enclosing the phosphor materials in a quartz vessel, evacuating and sealing said vessel, enclosing said vessel in a comparatively thick-walled crucible of graphite which has relatively high mechanical strength at said melting point temperatures, initially heating said quartz vessel and crucible at a sufficiently rapid rate that the vessel is raised above its softening point before said phosphor materials develop substantial vapor pressure, further heating said vessel to the melting temperature of said phosphor materials, and thereafter cooling said vessel at a controlled rate to promote crystal growth in said phosphor materials.

4. Apparatus for growing crystals from materials having relatively high vapor pressures at elevated temperatures and having relatively high melting points comprising a sealed and evacuated vitreous vessel enclosing crystal-forming materials, said vitreous vessel having a softening point below the melting points of said materials, a comparatively thick-walled crucible of a refractory substance enclosing said vessel in a close fitting cavity, powder of said refractory substance packed between the walls of said vessel and the cavity walls, and a furnace having a sufficiently high heating capacity to allow initially heating said vitreous vessel and said crucible at such a rapid rate that the vessel is raised above its softening point before said crystal forming materials develop substantial vapor pressure.

5. Apparatus for growing crystals from materials having relatively high vapor pressures at elevated temperatures and having melting points at temperatures not lower than approximately 1400° C., comprising a sealed and evacuated quartz tube enclosing crystal-forming materials, a comparatively thick-walled graphite crucible enclosing said tube in a close fitting cavity, graphite powder packed between the walls of said tube and the cavity walls, and a furnace having a sufficiently high heating capacity to allow initially heating said quartz tube and said crucible at such a rapid rate that the tube is raised above its softening point before said crystal forming materials develop substantial vapor pressure.

References Cited in the file of this patent

UNITED STATES PATENTS 2,675,303     Sobek _____ Apr. 13, 1954

OTHER REFERENCES

Fischer: Z. Naturfosh., vol. 13a, pp. 105–110, February 1958.

Piper: J. Chem. Phys., vol. 20, pp. 1343, 1952.

Pizarello: J. Appl. Phys., vol. 25, pp. 804, 1954.

Czyzak: J. Appl. Physics, vol. 23, pages 932–933 (1952).